(12) United States Patent
Krull et al.

(10) Patent No.: US 10,376,823 B2
(45) Date of Patent: Aug. 13, 2019

(54) FILTER ELEMENT HAVING MOUNTING FRAME

(71) Applicants: Timothy L. Krull, Kearney, NE (US); Michael J. Von Seggern, Kearney, NE (US); Jeffrey E. D. Rogers, Kearney, NE (US); Trenton Yendra, Gibbon, NE (US)

(72) Inventors: Timothy L. Krull, Kearney, NE (US); Michael J. Von Seggern, Kearney, NE (US); Jeffrey E. D. Rogers, Kearney, NE (US); Trenton Yendra, Gibbon, NE (US)

(73) Assignee: Baldwin Filters, Inc., Kearney, NE (US)

(*) Notice: Subject to any disclaimer, the term of this patent is extended or adjusted under 35 U.S.C. 154(b) by 0 days.

(21) Appl. No.: 15/777,294

(22) PCT Filed: Nov. 15, 2016

(86) PCT No.: PCT/US2016/062041
§ 371 (c)(1),
(2) Date: May 18, 2018

(87) PCT Pub. No.: WO2017/087389
PCT Pub. Date: May 26, 2017

(65) Prior Publication Data
US 2018/0361293 A1 Dec. 20, 2018

Related U.S. Application Data

(60) Provisional application No. 62/257,891, filed on Nov. 20, 2015.

(51) Int. Cl.
*B01D 46/00* (2006.01)
*F02M 35/024* (2006.01)
(Continued)

(52) U.S. Cl.
CPC ..... *B01D 46/0005* (2013.01); *B01D 46/0001* (2013.01); *B01D 46/0002* (2013.01);
(Continued)

(58) Field of Classification Search
CPC ............ B01D 46/0001; B01D 46/0002; B01D 46/0005; B01D 46/525; B01D 46/527;
(Continued)

(56) References Cited

U.S. PATENT DOCUMENTS 6,190,432 B1 * 2/2001 Gieseke ............. B01D 46/0001
55/385.3
6,517,598 B2 2/2003 Anderson et al.
(Continued)

FOREIGN PATENT DOCUMENTS

JP 2011-514948 A 5/2011
WO WO 2011/115973 A2 9/2011

*Primary Examiner* — Robert Clemente
(74) *Attorney, Agent, or Firm* — Reinhart Boerner Van Deuren P.C.

(57) ABSTRACT

A filter element with an improved mounting frame and method of assembly are provided. The filter element includes a filter media pack with a mounting frame attached to the outer periphery of the filter media pack. The mounting frame defines a channel that holds a shut-off material for preventing leakage of an adhesive securing the mounting frame to the filter media pack. A filter element that includes a polymeric material between the filter media pack and the adhesive is also provided. The shut-off material may be pre-formed or applied in a flowable state.

35 Claims, 10 Drawing Sheets

(51) Int. Cl.
B01D 46/52 (2006.01)
F16J 15/10 (2006.01)
F16J 15/14 (2006.01)

(52) U.S. Cl.
CPC ......... B01D 46/525 (2013.01); B01D 46/527 (2013.01); F02M 35/0245 (2013.01); F02M 35/02416 (2013.01); F02M 35/02425 (2013.01); F02M 35/02483 (2013.01); F16J 15/10 (2013.01); F16J 15/108 (2013.01); F16J 15/14 (2013.01); B01D 2265/04 (2013.01); B01D 2271/027 (2013.01); F02M 35/02408 (2013.01)

(58) Field of Classification Search
CPC .......... B01D 2265/04; B01D 2271/027; F02M 35/02416; F02M 35/02425; F02M 35/02483; F02M 35/02408; F02M 35/0245; F16J 15/10; F16J 15/108; F16J 15/14
See application file for complete search history.

(56) References Cited

U.S. PATENT DOCUMENTS

| | | | |
|---|---|---|---|
| 2002/0185007 A1* | 12/2002 | Xu | B01D 46/0004 95/273 |
| 2002/0185008 A1* | 12/2002 | Anderson | B01D 46/0004 95/287 |
| 2006/0090434 A1* | 5/2006 | Brown | B01D 46/527 55/498 |
| 2006/0091064 A1* | 5/2006 | Brown | B01D 46/527 210/450 |
| 2006/0091066 A1* | 5/2006 | Driml | B01D 46/001 210/493.1 |
| 2006/0091084 A1* | 5/2006 | Merritt | B01D 25/001 210/767 |
| 2007/0175187 A1* | 8/2007 | Kopec | B01D 46/0005 55/385.3 |
| 2007/0186528 A1* | 8/2007 | Wydeven | B01D 46/0005 55/498 |
| 2009/0211450 A1* | 8/2009 | Mosset | B01D 46/0001 95/273 |
| 2010/0192530 A1 | 8/2010 | Wydeven et al. | |
| 2010/0242425 A1* | 9/2010 | Swanson | B01D 46/2411 55/498 |
| 2011/0197556 A1* | 8/2011 | Brown | B01D 46/527 55/498 |
| 2013/0000267 A1* | 1/2013 | Merritt | B01D 46/527 55/490 |
| 2015/0306530 A1 | 10/2015 | Reichter et al. | |
| 2018/0361301 A1* | 12/2018 | Krisko | B01D 27/06 |

* cited by examiner

FILTER ELEMENT HAVING MOUNTING FRAME

FIELD OF THE INVENTION

This invention generally relates to filtration and particularly to filter elements used in filtration systems.

BACKGROUND OF THE INVENTION

Filtration systems are used to remove impurities from a stream of fluid such as from air for use in downstream systems. For example, air may be filtered prior to entering an internal combustion engine. In such a system, the filtration system will often include a replaceable filter element that performs the filtration, which can be replaced with a new filter once the filter element is filled with impurities or otherwise becomes spent.

The filter element may be mounted within a filter housing during use. A frame secured to a filter media pack will mount the filter element within the housing. The frame may be formed from molded plastic. Unfortunately, as filter elements become larger and there is a desire for increased production speeds, the dimensional consistency of the filter media packs and frames decreases such that less than ideal mating of the mounting frame to the outer periphery of the filter media pack exists. This can create leak paths between the frame and the filter media pack such that adhesive for securing the two components together will leak down the side of the filter media pack. This can reduce the ability to secure the mounting frame to the filter media pack as well as provide for reduced aesthetic appeal.

The present invention relates to improvements over the current state of the art for attaching the mounting frame to the filter media pack.

BRIEF SUMMARY OF THE INVENTION

New and improved filter elements are provided. The filter element includes an improved mounting frame for mounting the filter element to a filter housing. New and improved methods of forming the filter elements are also provided.

In one embodiment, a filter element including a filter media pack, a mounting frame, a shut-off material and an adhesive are provided. The filter media pack has first and second flow faces and an outer periphery extending therebetween. The mounting frame is positioned axially between the first and second flow faces and in surrounding relation of the outer periphery. The mounting frame includes an inner wall and an outer wall connected to the inner wall. The inner wall is positioned radially inward of the outer wall. The inner wall and outer wall form a channel therebetween. The shut-off material is positioned within the channel and extends out of the channel and into radial contact with the outer periphery of the filter media pack. The shut-off material, outer wall and outer periphery defining a cavity. The adhesive is located within the cavity and secures the mounting frame to the filter media pack.

In one embodiment, the shut-off material is a foamed urethane.

In one embodiment, the adhesive is a foamed urethane having a lower rise characteristic and cures to a harder material than the shut-off material.

In one embodiment, the shut-off material forms a free-rise surface that free rises out of the channel and bounds part of the cavity.

In one embodiment, the inner wall extends from a connection end that is connected to the outer wall and a free end. The inner wall is angled radially inward when moving from the connection end to the free end defines a lead in surface for assisting in installing the mounting frame around the filter media pack. The lead in surface being on an opposite side as a surface of the inner wall that defines part of the channel.

In one embodiment, the channel is formed radially between the outer wall and the inner wall and the inner wall is radially between the channel and the outer periphery of the filter media pack. A mouth of the channel faces axially towards one of the flow faces.

In one embodiment, the outer wall is longer than the inner wall.

In one embodiment, the cavity has a volume that is at least twice a volume of the channel.

In one embodiment, the outer wall extends from a connection end that is connected to the inner wall and a free end. The outer wall is angled radially outward when moving from the connection end to the free end.

In one embodiment, the inner wall proximate the free end of the inner wall tapers to a point. An inner surface of the taper is angled radially outward and away from the outer periphery of filter media pack when moving toward the free end.

In one embodiment, the filter media pack includes a filter media block and an outer layer secured around the filter media block. The outer layer defining the outer periphery of the filter media pack.

In one embodiment, a seal member is attached to the outer periphery of the filter media pack. The seal member is axially offset from the mounting frame.

In one embodiment, the shut-off material seals the cavity and prevents the adhesive from leaking between the inner wall of the mounting frame and the outer periphery of the filter media pack In one embodiment, a method of forming a filter element is provided. The method includes providing a filter media pack having first and second flow faces and an outer periphery extending therebetween. The method includes installing a mounting frame axially between the first and second flow faces and in surrounding relation of the outer periphery. The mounting frame includes an inner wall and an outer wall connected to the inner wall. The inner wall is positioned radially inward of the outer wall. The inner wall and outer wall form a channel therebetween. The method includes dispensing a shut-off material into the channel. The method includes allowing the shut-off material to rise out of the channel and into radial contact with the outer periphery of the filter media pack such that the shut-off material, outer wall and outer periphery defining a cavity. The method includes dispensing an adhesive into the cavity and securing the mounting frame to the filter media pack.

In one embodiment, the method further comprises heating the filter media pack, mounting frame and shut-off material to increase a cure rate of the shut-off material prior to dispensing the adhesive into the cavity.

In one embodiment, the shut-off material seals the cavity and prevents the adhesive from leaking between the inner wall of the mounting frame and the outer periphery of the filter media pack.

In one embodiment, the shut-off material is a foamed urethane.

In one embodiment, the adhesive is a foamed urethane having a lower rise characteristic and cures to a harder material than the shut-off material.

In one embodiment, the step of allowing the shut-off material to rise forms a free-rise surface that free rises out of the channel and bounds part of the cavity.

In one embodiment, the step of dispensing a shut-off material into the channel dispenses an amount of shut-off material that does not contact the outer periphery of the filter media pack until the shut-off material has begun to rise out of the channel.

In one embodiment, the method further comprises attaching a seal member to the outer periphery of the filter media pack. The seal member defines an exposed sealing surface for sealing with a filter housing to which the filter element is to be mounted.

In another embodiment, a filter element including a filter media pack, a polymeric coating, a mounting frame, a shut-off material and an adhesive is provided. The filter media pack has first and second flow faces and an outer periphery extending therebetween. The polymeric coating covers at least a portion of the outer periphery of the filter media pack and defines an outer surface. The mounting frame is positioned axially between the first and second flow faces and in surrounding relation of the polymeric coating. The mounting frame includes an inner wall and an outer wall connected to the inner wall. The inner wall is positioned inward of the outer wall. The outer wall is spaced outward from an outer periphery of the polymeric coating forming a gap therebetween. The shut-off material is positioned within the gap and extends into radial contact with the outer surface of the polymeric coating and the outer wall. The shut-off material, outer surface of the polymeric coating and outer wall defining a cavity. The adhesive is located within the cavity and secures the mounting frame to the filter media pack.

In one embodiment, the shut-off material is a preformed component that is formed prior to being located between the outer wall and polymeric coating.

In one embodiment, the shut-off material abuts the inner wall.

In one embodiment, the volume of the shut-off material is less than half of the volume of the cavity.

In one embodiment, the shut-off material is compressed in a radial dimension extending between the polymeric coating and the outer wall.

In one embodiment, the shut-off material is compressed in the radial dimension by at least 10% at all locations around the polymeric coating.

In one embodiment, the preformed component is in the form of a tubular component having a hollow center.

In another embodiment, a method of forming a filter element is provided. The method includes providing a filter media pack having first and second flow faces and an outer periphery extending therebetween; applying a polymeric coating to the outer periphery of the filter media pack; installing a mounting frame axially between the first and second flow faces and in surrounding relation of the polymeric coating, the mounting frame including an inner wall and an outer wall connected to the inner wall, the inner wall being positioned inward of the outer wall, the outer wall being spaced outward from an outer periphery of the polymeric coating forming a gap therebetween; locating a shut-off material between the outer wall and the polymeric coating such that the shut-off material radially contacts the outer surface of the polymeric coating and the outer wall such that the shut-off material, polymeric coating and outer wall define a cavity; and dispensing an adhesive into the cavity and securing the mounting frame to the filter media pack.

In one embodiment, the shut-off material is a preformed component that is formed prior to being located between the outer wall and polymeric coating.

In one embodiment, locating the shut-off material includes inserting the shut-off material until the shut-off material abuts the inner wall.

In one embodiment, the volume of the shut-off material is less than half of the volume of the cavity.

In one embodiment, locating the shut-off material includes compressing the shut-off material in a radial dimension extending between the polymeric coating and the outer wall.

In one embodiment, the shut-off material is compressed in the radial dimension by at least 10% at all locations around the polymeric coating.

In one embodiment, the shut-off material is located around the polymeric coating prior to installing the mounting frame and the step of locating a shut-off material occurs by installing the mounting frame over the polymeric material and shut-off material.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
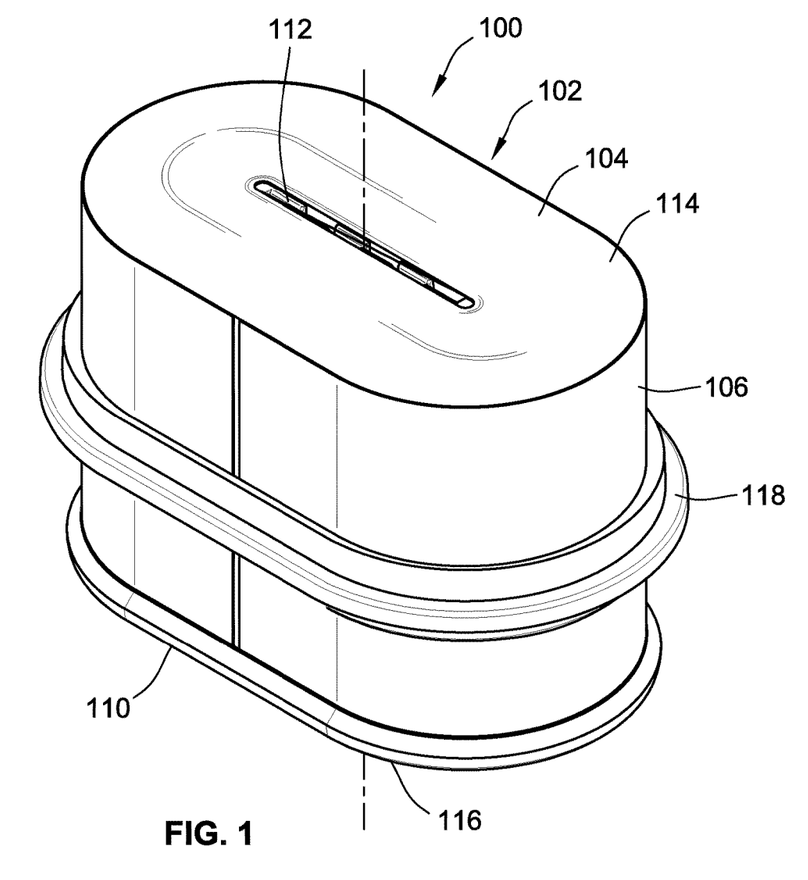
FIG. 1 is a simplified perspective view of a filter element according to an embodiment of the present invention.

FIG. 1 illustrates a representative embodiment of a filter element 100 according to the instant invention. The filter element 100 is used for filtering a flow of liquid that passes through the filter element 100. In a particular implementation, the filter element 100 is designed to filter air passing through the filter element 100.

The filter element 100 is designed to be mounted to a filter housing 160 (see FIG. 2) in a sealing manner to prevent fluid bypass around the filter element 100 and to force the fluid through the filter element 100 to remove impurities.

The filter element 100, in the embodiment of FIG. 1, has a filter media pack 102 (also referred to simply as "a media pack") that includes a filter media block 104 and a porous outer layer 106 operably secured to an outer peripheral surface 108 of the filter media block 104. In this embodiment, the outer layer 106 generally defines an outer periphery of the filter media pack 102 that extends axially between opposed first and second flow faces 114, 116.

The filter media block 104, in one embodiment, is formed from layers of fluted filter media. The layers of fluted filter media are formed from a flat first sheet of filter media (also referred to as "a face sheet" or "single face") operably secured to a second corrugated sheet of filter media to form a plurality of axially extending inlet and outlet flutes that are operably sealed to force the flow of fluid to pass through the flat sheet or the corrugated sheet to filter impurities from the fluid flow.

The combined flat sheet and corrugated sheet are then, in the illustrated embodiment, wound around a winding core 112 to form a plurality of layers of fluted filter media as is well known in the art to form the filter media block 104. An adhesive is provided between adjacent layers to secure the layers together and to seal the adjacent layers and prevent a path for unfiltered air to bypass the filter media and further form the inlet and outlet flutes.

In the illustrated embodiment, the filter media block 104 is generally race-track shaped however the present invention may utilize filter media blocks 104 of other shapes, such as for example, round, oval, rectangular, triangular, etc. Further, while the filter media block 104 in the illustrated embodiment has generally flat opposed flow faces 114, 116 through which the fluid flows, other embodiments could have the flow faces form recesses or projections, e.g. by having adjacent layers axially offset from one another forming a projection at one flow face and a corresponding recess at the other flow face.

The flutes of the fluted filter media will extend axially between the opposed flow faces 114, 116. One face 114, 116 will be considered an inlet flow face in which dirty fluid enters the filter media block 104 while the opposed flow face 116, 114 will be considered an outlet flow face through which cleaned fluid exits the filter media block 104.

A seal member 110 is attached to the outer peripheral surface of filter media pack 102 provided by outer layer 106. The outer layer helps secure the seal member 110 to the media pack 102 as well as to strengthen the connection between the outer most layers of fluted filter media of the filter media block 104 and counteract any weakening of the media pack 102 that may occur based on operating environment. The seal member 110 provides an exposed sealing surface configured to seal with a corresponding seal surface of the filter housing 160. In this embodiment, the seal member 110 provides a radially directed seal.

Figure 2:
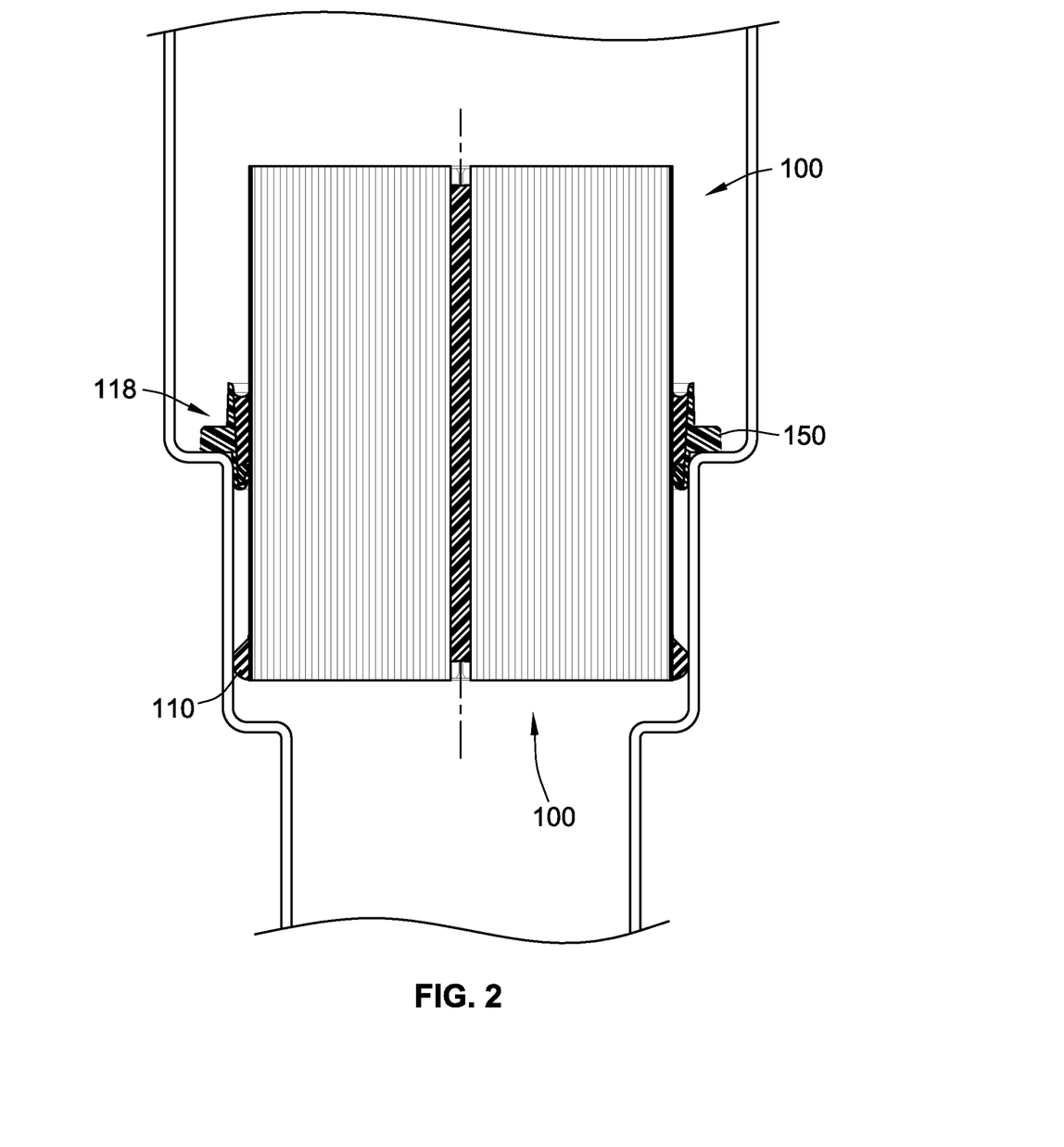
FIG. 2 illustrates the filter element of FIG. 1 mounted in a filter housing.

A mounting frame 118 is mounted to the outer peripheral surface of the filter media pack 102 and is used to secure the filter element 100 within the filter housing 160 as illustrated in FIG. 2. In this embodiment, the filter housing 160 includes a stepped region 162 against which the mounting frame 118 rests when the filter element 100 is mounted in the filter housing 160.

Figure 3:
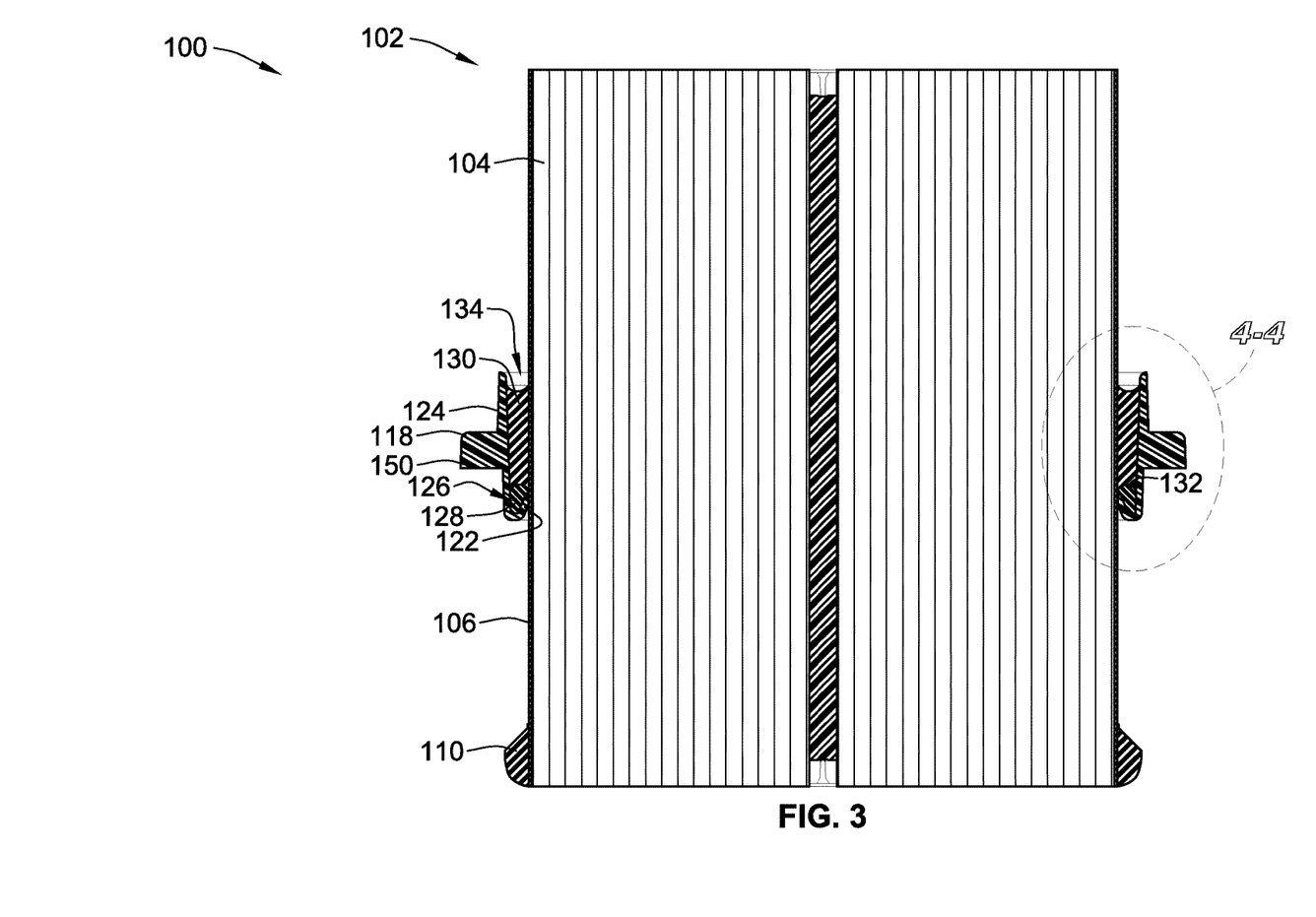
FIG. 3 is a cross-sectional illustration of the filter element of FIG. 1.
Figure 4:
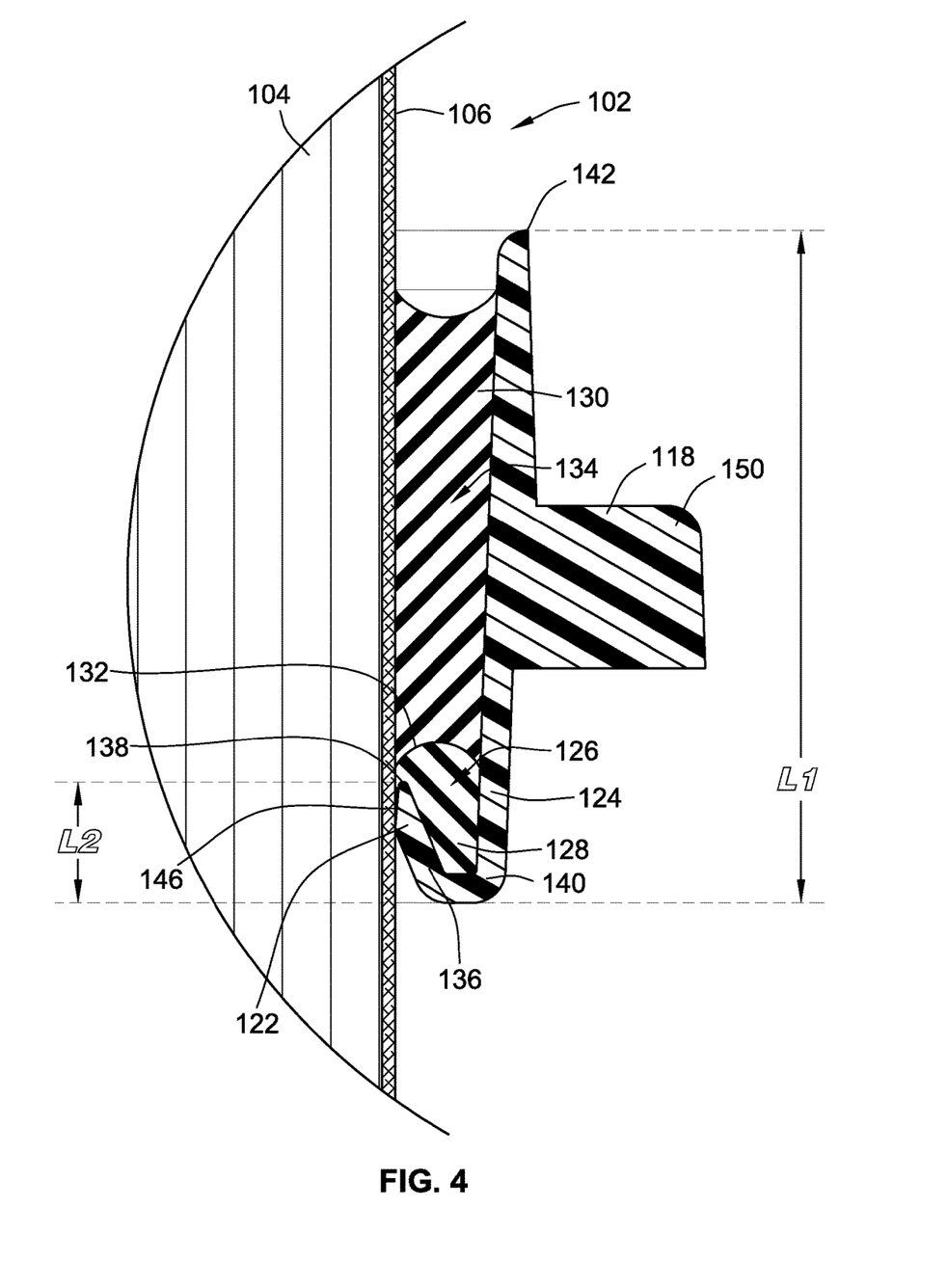
FIG. 4 is an enlarged illustration of the attachment of the mounting frame to the filter media pack of the filter element of FIG. 1.

With reference to FIGS. 3 and 4, the mounting frame 118 is adhesively secured to the outer periphery of the filter media pack 102 and particularly to outer periphery defined by an outer surface of the outer layer 106. In a preferred embodiment, the outer layer is a polyester nonwoven material that improves the strength of the connection between the mounting frame 118 and the filter media pack 102.

The mounting frame 118 is formed from molded plastic, and particularly nylon in this embodiment.

The mounting frame 118 includes an inner wall 122 and an outer wall 124 that form a channel 126 therebetween. The channel 126 is used to hold a shut-off material 128 during assembly of the filter element 100 and particularly during attachment of the mounting frame 118 to the filter media pack 102. The shut-off material 128 is used to compensate for any gaps that form between the mounting frame 118 and the outer periphery of the filter media pack 102 to prevent leakage of adhesive 130 during assembly.

In a preferred embodiment, the shut-off material 128 is a foamed urethane that will free rise after being dispensed into the channel 126. Typically, a dispensed volume of the shut-off material 128 during assembly is less than or equal to the volume of channel 126. As the shut-off material 128 expands and free-rises, the shut-off material 128 will expand out of the channel 126 and radially into contact with the outer peripheral surface of the filter media pack 102, e.g. outer layer 106 in this embodiment. The engagement of the shut-off material 128 with the outer periphery of the filter media pack 102, as noted above, prevents leakage of the adhesive 130 during manufacturing.

In one embodiment, the shut-off material 128 is a 400 percent rise foamed urethane. When dispensed, the shut-off material 128 typically has a low viscosity. However, as the shut-off material cures and free-rises the viscosity increases such that the shut-off material 128 will not freely flow through any gaps that may be formed between the filter media pack 102 and the mounting frame 118 and particularly the inner wall 122 of the mounting frame due to dimensional inconsistencies in the components. There may be some minor flow of shut-off material 128 between the inner wall 122 and the media pack 102 but it will typically not flow beyond or significantly beyond the connection end 136 of the inner wall 122.

The outer wall 124 has a length L1 that is greater than L2. The outer wall 124, the top free-rise surface 132 of the shut-off material 128 and the outer periphery of the filter media pack 102 defines a cavity 134 that holds adhesive 130. In one embodiment, the adhesive 130 is a 200 percent rise foamed urethane. The adhesive 130 may have a cured hardness value that is greater than the shut-off material 128 after both materials have cured.

Preferably, the filter media pack 102, mounting frame 118 and shut-off material 128 are heated prior to dispensing the adhesive 130 to promote curing of the shut-off material 128 prior to dispensing the adhesive 130 into cavity 134.

The inner wall 122 of the mounting frame 118 is positioned radially between the outer wall 124 and the filter media pack 102. The inner wall 122 extends between a connection end 136 to a free end 138. The outer wall 124 extends between a connection end 140 and a free end 142. The connection end 136 of the inner wall 122 is connected to the connection end 140 of the outer wall to form a bottom of the channel 126.

The inner wall 122 extends radially inward at an angle relative to the filter media pack 102 such that the connection end 136 is radially further from the filter media pack 102 than the free end 138. The inner wall 122 defines a lead in section that facilitates installing the mounting frame 118 around the filter media pack 102.

The inner wall 122 is tapered proximate the free end 138 and defines an inner surface 146 that angles radially away from the outer periphery of the filter media pack 102 when mounted.

The outer wall 124 extends radially outward when moving between the connection end 140 toward the free end 142 at a smaller angle than the angle provided by the inner wall 122. The radial outward angle of the outer wall 124 helps with dispensing adhesive 130 into cavity 134 during assembly.

The length of L1 to L2 is ideally such that the cavity 134 has a volume that is at least double the volume of channel 126 and more preferably at least triple.

A mounting feature 150 extends radially outward from the outer wall 124. The mounting feature 150 mates with the filter housing 160 for locating the filter element 100 in the filter housing 160 as illustrated in FIG. 2.

In the illustrated embodiment, the seal member 110 is axially offset from the mounting frame 118.

In alternative embodiments, the mounting frame 118 could carry a seal member for cooperating with the filter housing.

Figure 5:
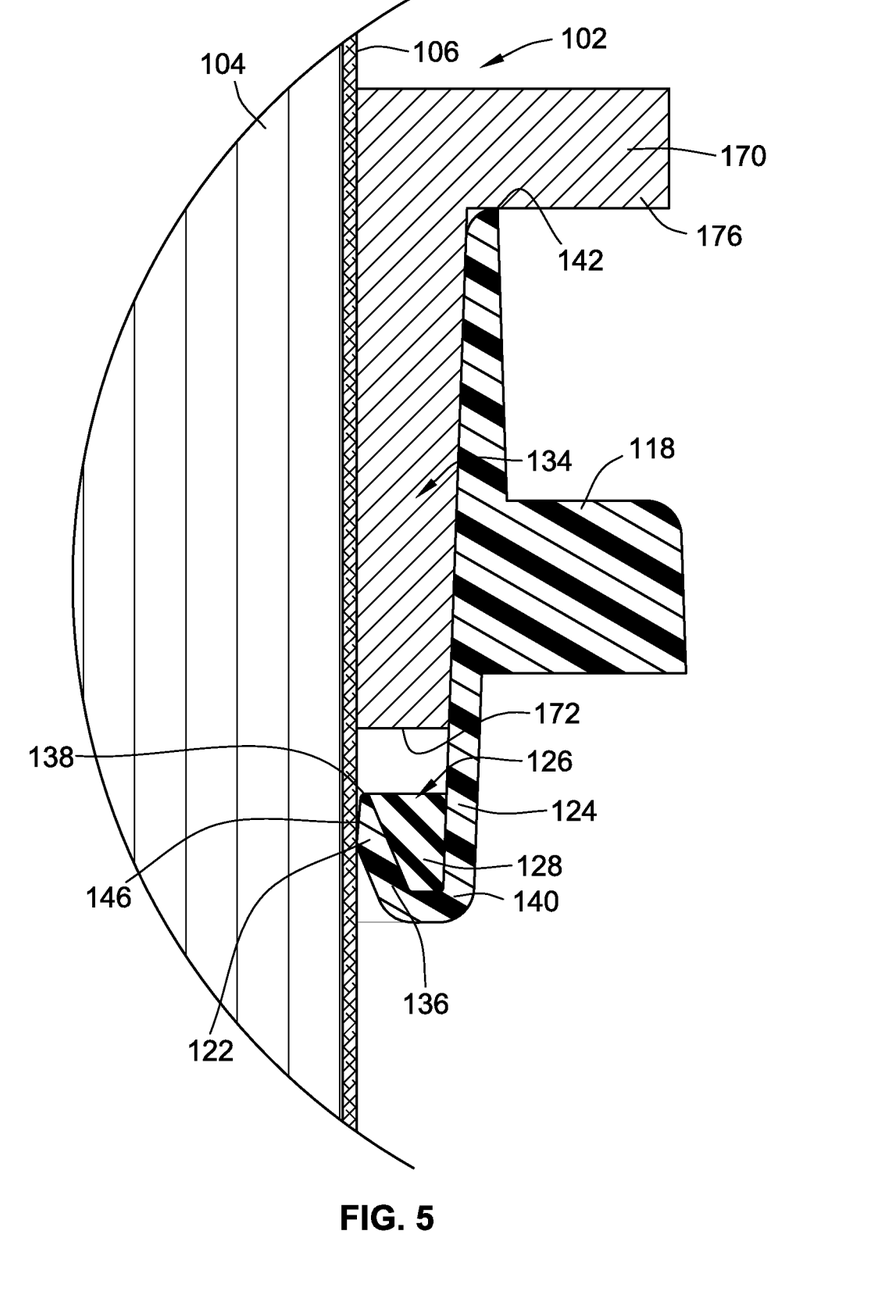
FIGS. 5 and 6 illustrate the use of a limiting plate limiting the amount of free-rise allowed by a free-rising or expanding shut-off material.
Figure 6:
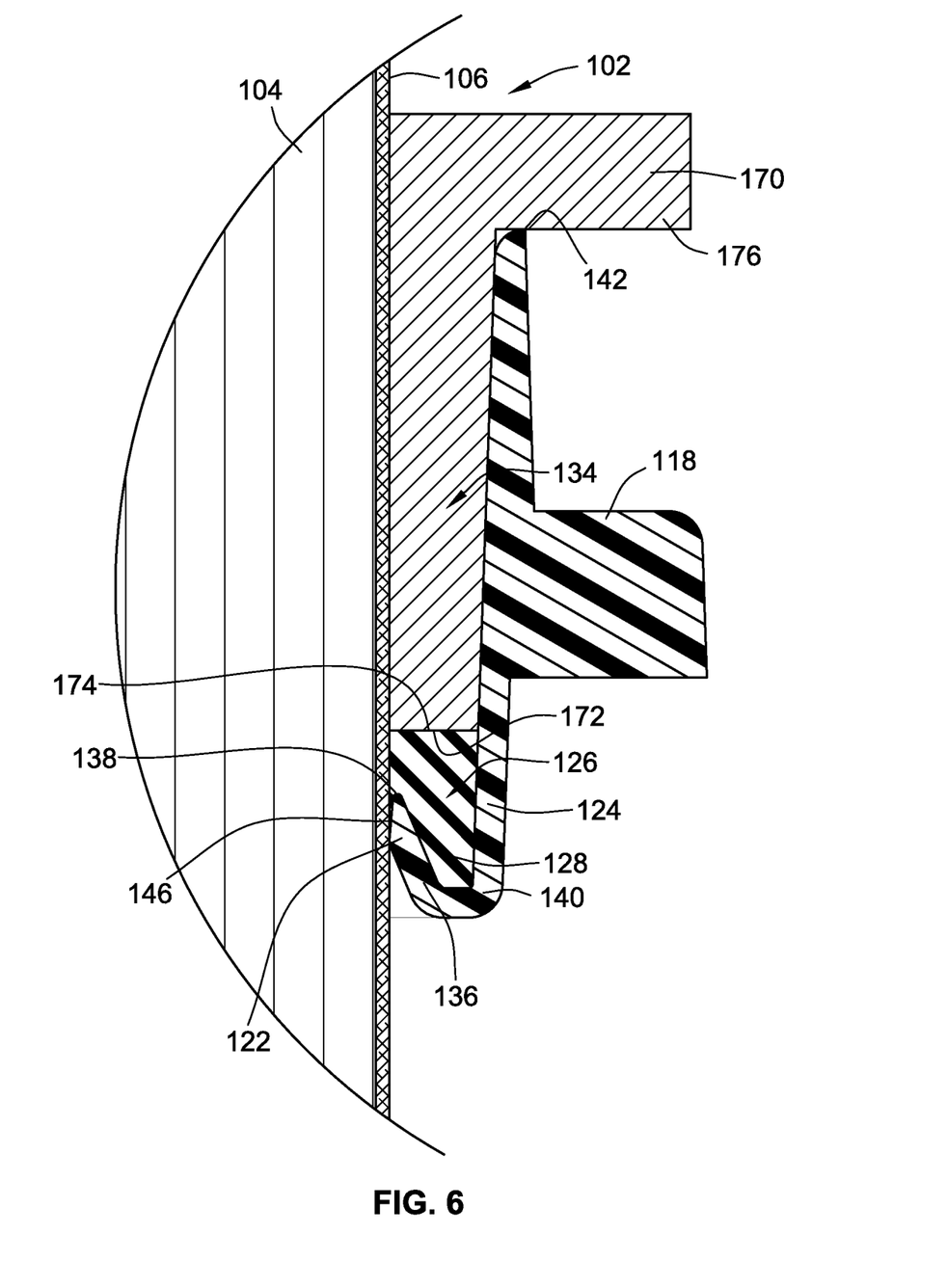

With reference to FIGS. 5 and 6, in an alternative embodiment of a method for forming the filter element, the shut-off material 128 may not result in a free-rise surface that bounds part of cavity 134. Instead, a limiting plate 170 may be used to limit the amount of axial free rise of the shut-off material 128 generally parallel to the outer periphery of the filter media pack 102.

After dispensing the shut-off material 128 into channel 126, the limiting plate 170 is inserted between the filter media pack 102 and the outer wall 124. The limiting plate 170 has a stop surface 172 that limits the amount of free-rise (also referred to as expansion) possible for the shut-off material. One benefit of this arrangement is that if the volume formed between stop surface 172 and the portion of the mounting frame 118 forming the channel 128 is less than the expected fully expanded shut-off material, this will force the expanded shut-off material 128 into radial contact with the outer periphery of the filter media pack 102 (i.e. the outer layer 106 in the illustrated embodiment).

FIG. 5 illustrates the shut-off material 128 after it is dispensed in channel 126 and FIG. 6 illustrates the shut-off material 128 after it has expanded into contact with the stop surface 172. In this embodiment, the resulting top surface 174 of the shut-off material 128 will be a smooth surface. While the stop surface 172 in the illustrated embodiment is generally orthogonal to the outer periphery of the filter media pack 102, in other embodiments it could be angled, such as at an angle that directs the free-rising shut-off material radially inward toward the outer periphery of the filter media pack 102.

In this embodiment, the limiting plate 170 includes radially outward extending abutment 176 configured to limit the axial insertion of the limiting plate 170 and particularly stop surface 172 into the cavity 134.

After a predetermined period of time allotted for expansion of the shut-off material 128, the limiting plate 170 can be removed and the adhesive discussed previously can be added into the resulting cavity 134 as discussed above.

Figure 7:
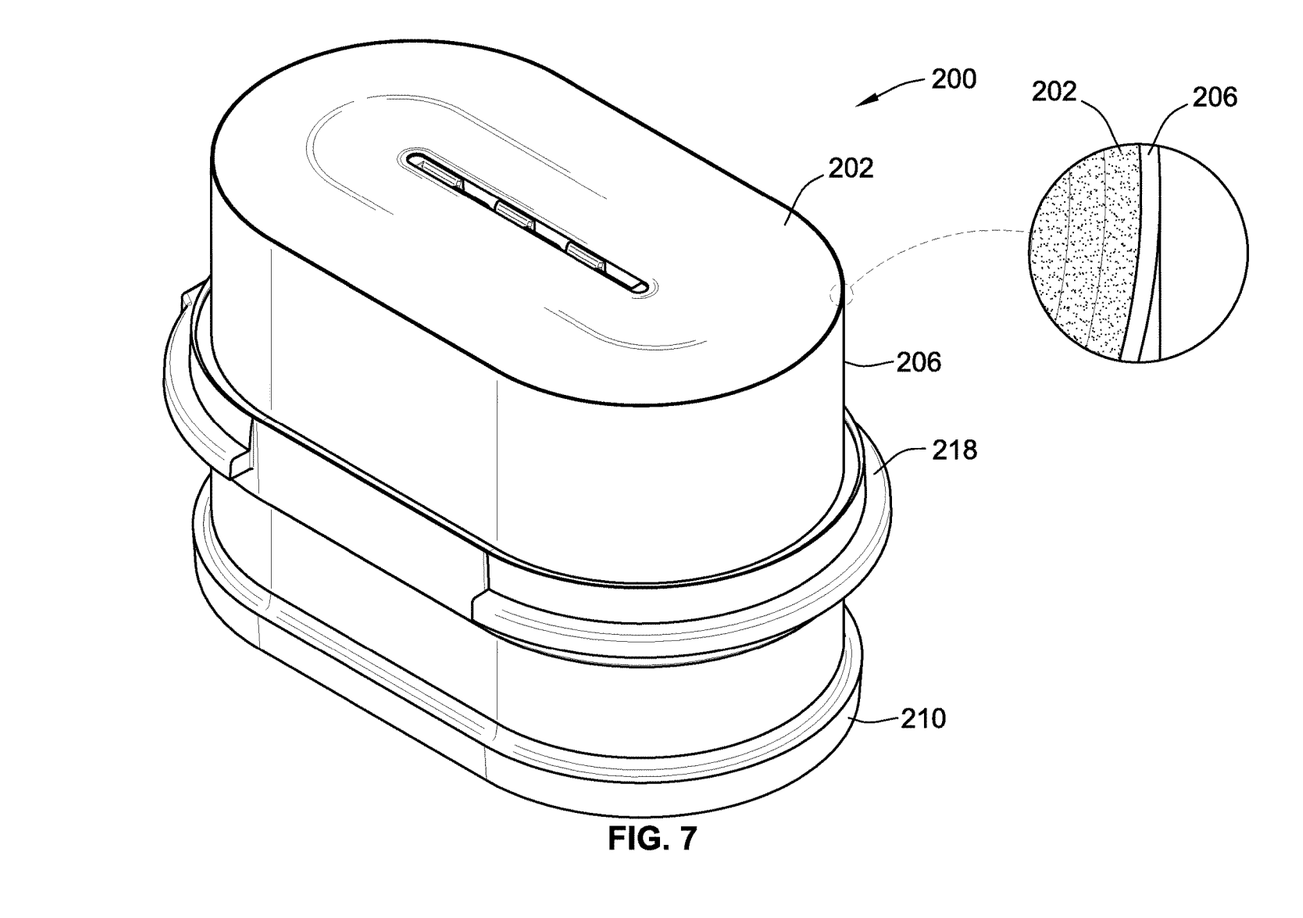
FIG. 7 is a simplified perspective view of a filter element according to an embodiment of the present invention.
Figure 8:
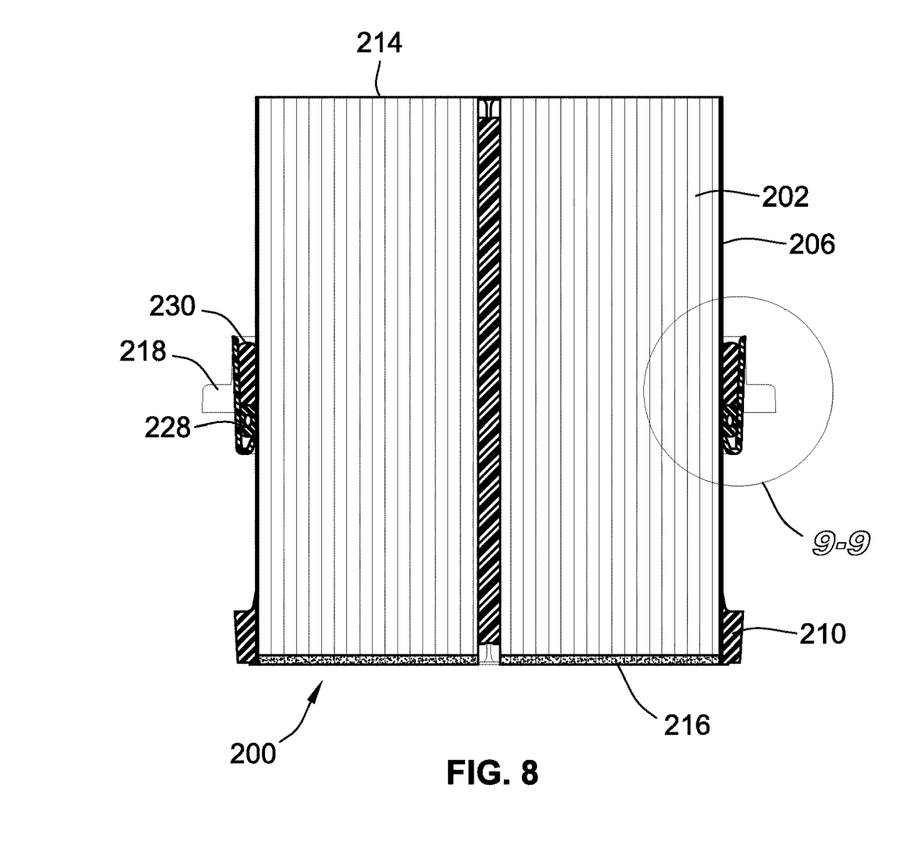
FIG. 8 is a cross-sectional illustration of the filter element of FIG. 7.
Figure 9:
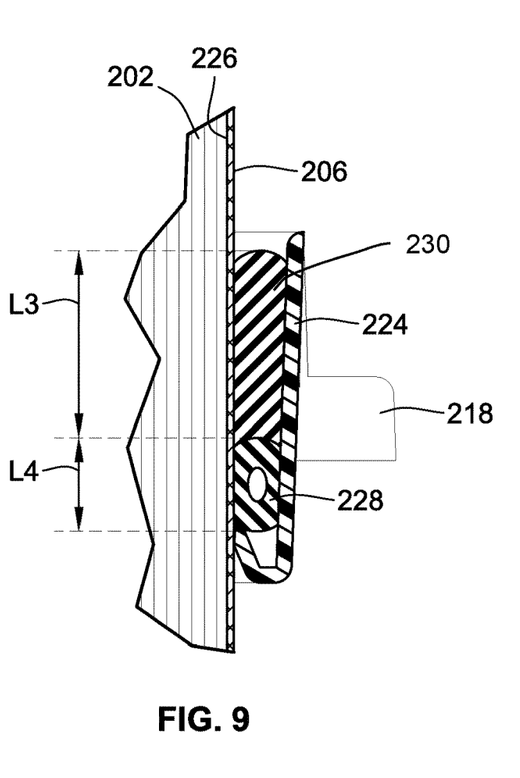
FIG. 9 is an enlarged illustration of the attachment of the mounting frame of the filter element of FIG. 7.

FIGS. 7-9 illustrate a further embodiment of a filter element 200. This embodiment is similar to the prior embodiment in many ways and the principle differences will be described below.

The filter element 200 includes a filter media pack 202. The outer surface of the filter media pack 202 is at least partially covered with a polymeric coating 206. In the illustrated embodiment, the entire outer surface of the filter media pack 202 is covered with polymeric coating 206. Advantageously, the polymeric coating 206 is not a molded structure and, therefore, requires no mold tooling, which can be expensive to make for various sizes and to maintain. Instead, in preferred embodiments, the polymeric coating 206 is applied directly to the outer surface of the filter media pack 202 as a liquid, or other flowable/fluid material, that cures or hardens in place into a solid coating or layer. The polymeric coating 206 and application thereof is more fully described in U.S. Patent application No. 62/297,569, entitled "Surface Coated Filter and Method," and is assigned to the assignee of the instant application. The teachings and disclosure of which are incorporated herein in their entireties.

Besides having the polymeric coating 206, a difference between this embodiment and the prior embodiment is that the shut-off material 228 is not in the form of a liquid material that is applied in a liquid or flowable form, which then cures, such as shut-off material 128 discussed above.

In this embodiment, the shut-off material 228 is located between the polymeric coating 206 and the mounting frame 218. Further, the shut-off material 228 is a preformed gasket such a molded gasket. More particularly, the shut-off material 228 is in the form of a tubular gasket. The tubular configuration of the shut-off material 228 provides flexibility to the preformed component. This flexibility allows the shut-off material 228 to compensate for inconsistencies in the shape of the outer surface of the polymeric coating 206 that provides inconsistencies in the gap, if any, between the mounting frame 218 and the outer surface of the polymeric coating 206. The shut-off material 228 acts to plug the gap, if any, between the mounting frame 218 and the outer surface of the polymeric coating 206 to prevent leakage therethrough of adhesive 230 during assembly.

The shut-off material 218 could be formed from various materials including rubber, such as rubber hose, foam, such as a preformed foam gasket, as well as extruded neoprene foam. While illustrated as a hollow tube-like structure in the illustrated embodiment, other embodiments and shapes could be provided. The material used to form the shut-off material 228 can influence the shape of the component.

The mounting frame 218 includes an outer wall 224 and inner wall 226. The outer wall 224 is spaced radially outward from the outer surface of the polymeric coating 206 forming a gap therebetween. The shut-off material 228 can axially abut the inner wall 226 of the mounting frame 218 such that it is sufficiently axially inserted into the gap formed between the outer wall 224 and the outer surface of the polymeric coating 206. The inner wall 226 thus acts as an axial limiting feature that limits the extent of axial insertion of the shut-off material 228.

In this embodiment, the shut-off material 228 does not contact the filter media pack 202. Instead, it contacts the outer surface of the polymeric coating 206. Further, in this embodiment, the portion of the frame that forms cavity 234 that holds the adhesive 230 to attach the mounting frame 218 is provided by the outer surface of the polymeric coating 206, the shut-off material 228 and the outer wall 224 of the mounting frame 218.

In the illustrated embodiment, the cavity 234 has a volume that is at least twice the volume of the shut-off material 228. Further, the cavity has an axial length L3 parallel to a flow direction of fluid through the filter media pack 202, e.g. between and through end faces 214, 216 that is greater than an axial length L4 of the shut-off material 228. Preferably, length L3 is at least twice length L4.

Further, it is desired that the shut-off material 228 is compressed in the radial direction, e.g. between the outer surface of the polymeric coating 206 and the inner surface of outer wall 224 and thus perpendicular to the flow direction through the filter media pack 202. In a preferred embodiment, the shut-off material 228, when using a preformed component, is compressed at least 10% in the radial direction at all locations around the polymeric coating 206 when installed prior to applying adhesive 230 and more preferably at least 20% such that sufficient sealing is provided by the shut-off material 228.

It is noted that the pre-formed shut-off material could be used in the prior embodiment as well.

Further, it is note that the cross-sectional profile of seal member 210 is different in this embodiment as compared to seal member 110 of the prior filter element 100.

Additionally, while filter element 200 uses the preformed shut-off material, other embodiments, can use the shut-off material 118 of the prior embodiment in combination with the filter media pack 200 and polymeric coating 206.

To form the filter element 200, the mounting frame 218 may be located around the outer surface of the polymeric material 206 and then the shut-off material 208 may be located within the gap provided between the mounting frame 218 and the outer surface of the polymeric material 206.

Alternatively, the shut-off material 228 may be placed around the polymeric material 206 and then the mounting frame 218 is located around the shut-off material 228 by axially sliding the mounting frame 218 over the polymeric material and shut-off material 228 to locate the shut-off material between the mounting frame 218 and polymeric material. When this order is used, an adhesive may be used to affix the shut-off material 228 to a particular location axially along the polymeric material 206 between the flow faces 214, 216 and prevent displacement of the shut-off material 228 during assembly. Further, the shut-off material 228 could then act as an axial stop indicating to the assembler when the frame is in the desired axial location relative to the polymeric coating 206 and filter media pack 202.

Figure 10:
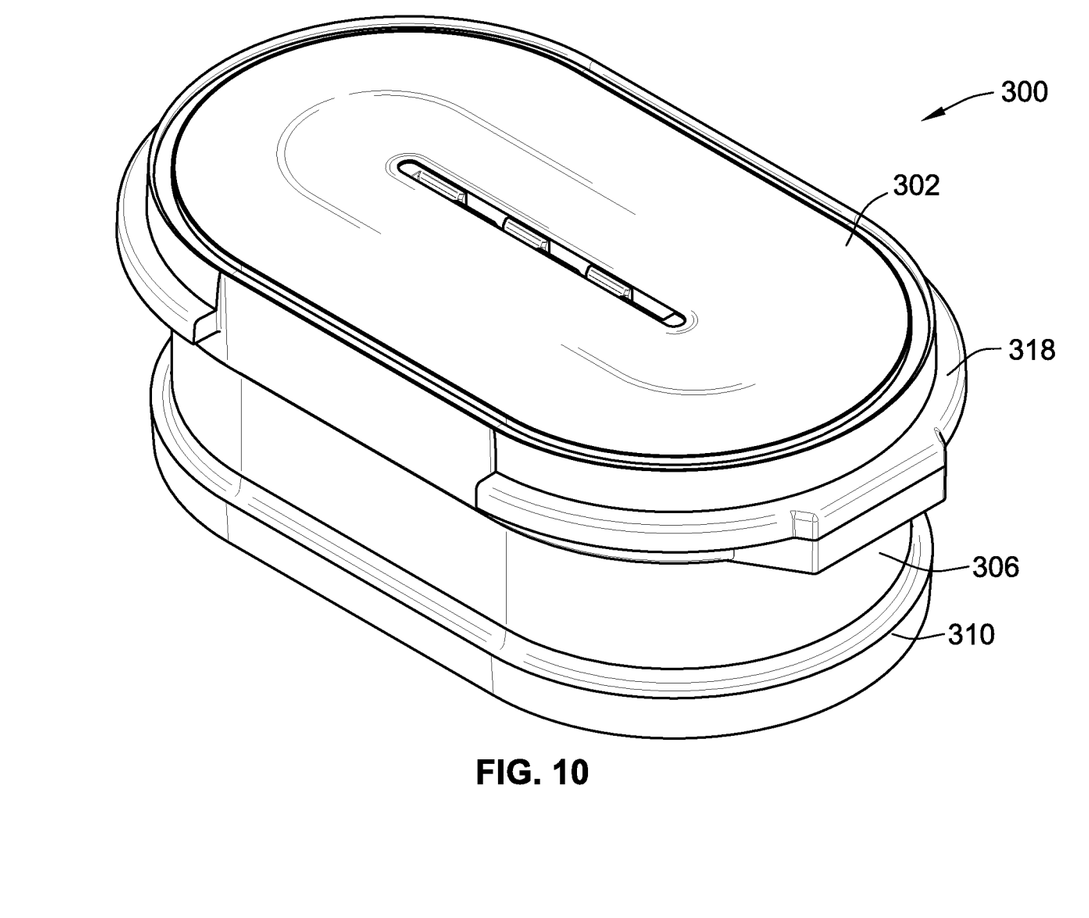
FIGS. 10 and 11 illustrate an alternative embodiment of a filter element similar to FIG. 7.
Figure 11:
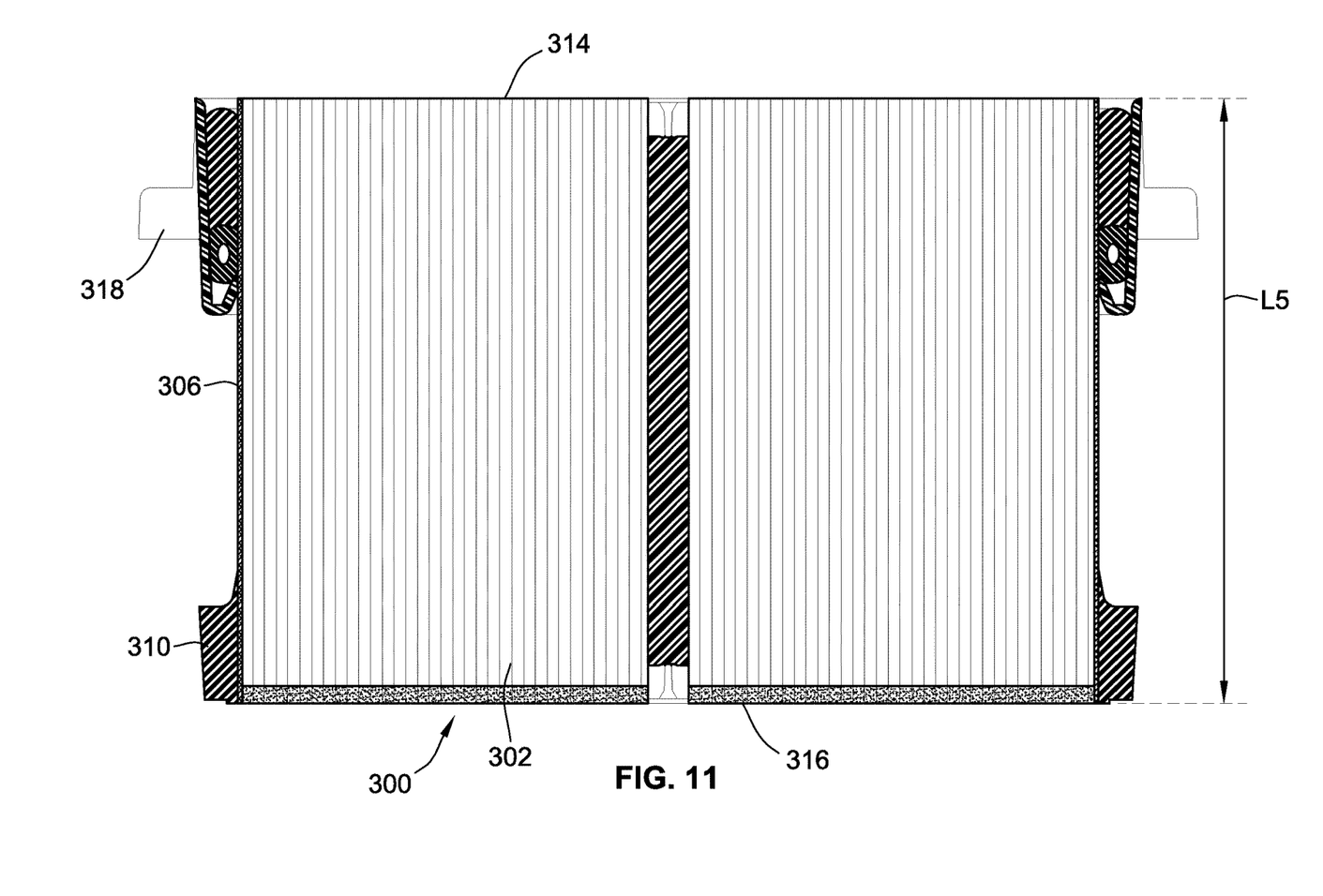

FIGS. 10 and 11 illustrate a further embodiment of a filter element 300. This embodiment is substantially similar to filter element 200. However, the axial position of the mounting frame 318 is located closer to a flow face, and particularly flow face 314. However, the mounting frame 318 is still positioned between the flow faces 314 and 316. Between the flow faces shall include being located at least in part between the flow faces unless expressly being described as being "entirely between" the flow faces, where the entire mounting frame must not extend beyond one of the flow faces 314, 316. Being even with a flow face will be considered to be between the flow faces.

The mounting frame 318 is illustrated as being mounted to the outer surface of the polymeric material 306 in substantially the same manner as in filter element 200 described previously. All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
   a filter media pack having first and second flow faces and an outer periphery extending therebetween;
   a mounting frame positioned axially between the first and second flow faces and in surrounding relation of the outer periphery, the mounting frame including an inner wall and an outer wall connected to the inner wall, the inner wall being positioned radially inward of the outer wall, the inner wall and outer wall forming a channel therebetween;
   a shut-off material positioned within the channel and extending out of the channel and into radial contact with the outer periphery of the filter media pack, the shut-off material, outer wall and outer periphery defining a cavity; and
   an adhesive located within the cavity and securing the mounting frame to the filter media pack.

2. The filter element of claim 1, wherein the shut-off material is a foamed urethane.

3. The filter element of claim 2, wherein the adhesive is a foamed urethane having a lower rise characteristic and curing to a harder material than the shut-off material.

4. The filter element of claim 1, wherein the shut-off material forms a free-rise surface that free rises out of the channel and bounds part of the cavity.

5. The filter element of claim 1, wherein the inner wall extends from a connection end that is connected to the outer wall and a free end, the inner wall angled radially inward when moving from the connection end to the free end defining a lead in surface for assisting in installing the mounting frame around the filter media pack.

6. The filter element of claim 5, wherein the channel is formed radially between the outer wall and the inner wall.

7. The filter element of claim 1, wherein the outer wall is longer than the inner wall.

8. The filter element of claim 7, wherein the cavity has a volume that is at least twice a volume of the channel.

9. The filter element of claim 7, wherein the outer wall extends from a connection end that is connected to the inner wall and a free end, the outer wall angled radially outward when moving from the connection end to the free end.

10. The filter element of claim 5, wherein the inner wall proximate the free end of the inner wall tapers to a point, an inner surface of the taper angled radially outward and away from the outer periphery of filter media pack when moving toward the free end.

11. The filter element of claim 1, wherein the filter media pack includes a filter media block and an outer layer secured around the filter media block, the outer layer defining the outer periphery of the filter media pack.

12. The filter element of claim 1, further comprising a seal member attached to the outer periphery of the filter media pack, the seal member being axially offset from the mounting frame.

13. The filter element of claim 1, wherein the shut-off material seals the cavity and prevents the adhesive from leaking between the inner wall of the mounting frame and the outer periphery of the filter media pack.

14. A method of forming a filter element comprises:
providing a filter media pack having first and second flow faces and an outer periphery extending therebetween;
installing a mounting frame axially between the first and second flow faces and in surrounding relation of the outer periphery, the mounting frame including an inner wall and an outer wall connected to the inner wall, the inner wall being positioned radially inward of the outer wall, the inner wall and outer wall forming a channel therebetween;
dispensing a shut-off material into the channel;
allowing the shut-off material to rise out of the channel and into radial contact with the outer periphery of the filter media pack such that the shut-off material, outer wall and outer periphery defining a cavity; and
dispensing an adhesive into the cavity and securing the mounting frame to the filter media pack.

15. The method of claim 14, further comprising heating the filter media pack, mounting frame and shut-off material to increase a cure rate of the shut-off material prior to dispensing the adhesive into the cavity.

16. The method of claim 14, wherein the shut-off material seals the cavity and prevents the adhesive from leaking between the inner wall of the mounting frame and the outer periphery of the filter media pack.

17. The method of claim 14, wherein the shut-off material is a foamed urethane.

18. The method of claim 17, wherein the adhesive is a foamed urethane having a lower rise characteristic and cures to a harder material than the shut-off material.

19. The method of claim 14, wherein the step of allowing the shut-off material to rise forms a free-rise surface that free rises out of the channel and bounds part of the cavity.

20. The method of claim 14, wherein the step of dispensing a shut-off material into the channel dispenses an amount of shut-off material that does not contact the outer periphery of the filter media pack until the shut-off material has begun to rise out of the channel.

21. The method of claim 14, further comprising attaching a seal member to the outer periphery of the filter media pack, the seal member defining an exposed sealing surface for sealing with a filter housing to which the filter element is to be mounted.

22. A filter element comprising:
a filter media pack having first and second flow faces and an outer periphery extending therebetween;
a polymeric coating covering at least a portion of the outer periphery of the filter media pack and defining an outer surface;
a mounting frame positioned axially between the first and second flow faces and in surrounding relation of the polymeric coating, the mounting frame including an inner wall and an outer wall connected to the inner wall, the inner wall being positioned inward of the outer wall, the outer wall being spaced outward from an outer periphery of the polymeric coating forming a gap therebetween;
a shut-off material positioned within the gap and extending into radial contact with the outer surface of the polymeric coating and the outer wall, the shut-off material, outer surface of the polymeric coating and outer wall defining a cavity; and
an adhesive located within the cavity and securing the mounting frame to the filter media pack.

23. The filter element of claim 22, wherein the shut-off material is a preformed component that is formed prior to being inserted between the outer wall and polymeric coating.

24. The filter element of claim 22, wherein the shut-off material abuts the inner wall.

25. The filter element of claim 22, wherein the volume of the shut-off material is less than half of the volume of the cavity.

26. The filter element of claim 23, wherein the shut-off material is compressed in a radial dimension extending between the polymeric coating and the outer wall.

27. The filter element of claim 26, wherein the shut-off material is compressed in the radial dimension by at least 10% at all locations around the polymeric coating.

28. The filter element of claim 23, wherein the preformed component is in the form of a tubular component having a hollow center.

29. A method of forming a filter element comprises:
providing a filter media pack having first and second flow faces and an outer periphery extending therebetween;
applying a polymeric coating to at least a portion of the outer periphery of the filter media pack;
installing a mounting frame axially between the first and second flow faces and in surrounding relation of the polymeric coating, the mounting frame including an inner wall and an outer wall connected to the inner wall, the inner wall being positioned inward of the outer wall, the outer wall being spaced outward from an outer periphery of the polymeric coating forming a gap therebetween;
locating a shut-off material between the outer wall and the polymeric coating such that the shut-off material radially contacts the outer surface of the polymeric coating and the outer wall such that the shut-off material, polymeric coating and outer wall define a cavity; and
dispensing an adhesive into the cavity and securing the mounting frame to the filter media pack.

30. The method of claim 29, wherein the shut-off material is a preformed component that is formed prior to being located between the outer wall and polymeric coating.

31. The method of claim 29, wherein locating the shut-off material includes inserting the shut-off material until the shut-off material abuts the inner wall.

32. The method of claim 29, wherein the volume of the shut-off material is less than half of the volume of the cavity.

33. The method of claim 30, wherein locating the shut-off material includes compressing the shut-off material in a radial dimension extending between the polymeric coating and the outer wall.

34. The method of claim 33, wherein the shut-off material is compressed in the radial dimension by at least 10% at all locations around the polymeric coating.

35. The method of claim 29, wherein the shut-off material is located around the polymeric coating prior to installing the mounting frame and the step of locating a shut-off material occurs by installing the mounting frame over the polymeric material and shut-off material.

* * * * *